United States Patent
Charpentier

(10) Patent No.: US 9,321,425 B2
(45) Date of Patent: Apr. 26, 2016

(54) AIRBAG COMPRISING TWO CHAMBERS AND A GAS FLOW CHANNEL CONNECTING THE TWO CHAMBERS WITH A VALVE BEING LOCATED IN THE GAS FLOW CHANNEL

(71) Applicant: AUTOLIV DEVELOPMENT AB, Vårgårda (SE)

(72) Inventor: Frederic Charpentier, Le Vauroux (FR)

(73) Assignee: AUTOLIV DEVELOPMENT AB, Vargarda (SE)

( * ) Notice: Subject to any disclaimer, the term of this patent is extended or adjusted under 35 U.S.C. 154(b) by 53 days.

(21) Appl. No.: 14/367,625

(22) PCT Filed: Dec. 20, 2012

(86) PCT No.: PCT/SE2012/051450
§ 371 (c)(1),
(2) Date: Jun. 20, 2014

(87) PCT Pub. No.: WO2013/095283
PCT Pub. Date: Jun. 27, 2013

(65) Prior Publication Data
US 2015/0298644 A1   Oct. 22, 2015

(30) Foreign Application Priority Data
Dec. 24, 2011   (DE) .......................... 10 2011 122 464

(51) Int. Cl.
  *B60R 21/233*   (2006.01)
  *B60R 21/239*   (2006.01)
  *B60R 21/231*   (2011.01)

(52) U.S. Cl.
  CPC ............. *B60R 21/239* (2013.01); *B60R 21/233* (2013.01); *B60R 2021/23153* (2013.01); *B60R 2021/23324* (2013.01)

(58) Field of Classification Search
  CPC combination set(s) only.
  See application file for complete search history.

(56) References Cited

U.S. PATENT DOCUMENTS 3,822,720 A * 7/1974 Souza ..................... F04B 43/08
                                               137/846
6,213,499 B1 * 4/2001 Khoudari .............. B60R 21/232
                                               280/729

(Continued)

FOREIGN PATENT DOCUMENTS

DE         19930155 A1    1/2001
DE     102009005834 A1    6/2009
EP         1595751 A1    11/2005

OTHER PUBLICATIONS

International Search Report and Written Opinion of the ISA, ISA/EP, Stockholm, mailed Mar. 22, 2013.

*Primary Examiner* — Nicole Verley
(74) *Attorney, Agent, or Firm* — Stephen T. Olson; Harness, Dickey & Pierce, P.L.C.

(57) ABSTRACT

An airbag includes a first chamber, a second chamber, and a gas flow channel connecting the two chambers. A valve is located inside the gas flow channel allows an unthrottled gas stream from the first chamber to the second chamber when a pressure inside the first chamber is higher than a pressure in the second chamber and blocks or throttles the gas stream through the gas flow channel when the pressure inside the second chamber is higher than in the first chamber. The valve includes a two-layered inlay extending from a first end pointing towards the first chamber to a second end pointing towards the second chamber. The two-layered inlay is connected to the gas flow channel at its first end via at least two connecting points being remote from each other. In order to make the manufacture of the airbag very easy and in order to provide a construction that allows the possibility of a defined throttling of the gas flow in the gas flow direction opposite to the unthrottled gas flow direction, a connection free area in which at least one layer of the two-layered inlay is without connection to the gas flow channel, is provided between the two connecting points and the two layers of the two-layered inlay are at least partially connected to each other in the area of the first end.

18 Claims, 6 Drawing Sheets

(56) References Cited

U.S. PATENT DOCUMENTS

| | | | | |
|---|---|---|---|---|
| 6,402,190 B1* | 6/2002 | Heudorfer | ............. | B60R 21/233 137/846 |
| 7,637,530 B2 | 12/2009 | Yamaji et al. | | |
| 7,819,424 B2* | 10/2010 | Toda | ............. | B60R 21/207 280/730.2 |
| 8,696,021 B2* | 4/2014 | Yamamoto | ............. | B60R 21/23138 280/730.2 |
| 8,757,657 B1* | 6/2014 | Hotta | ............. | B60R 21/233 280/730.2 |
| 8,770,620 B2* | 7/2014 | Hotta | ............. | B60R 21/233 280/730.2 |
| 8,915,519 B2* | 12/2014 | Hotta | ............. | B60R 21/2346 280/729 |
| 9,120,457 B2* | 9/2015 | Kino | ............. | B60R 21/207 |
| 2006/0175809 A1 | 8/2006 | Yamaji et al. | | |
| 2009/0322062 A1 | 12/2009 | Bauer et al. | | |
| 2010/0244418 A1* | 9/2010 | Honda | ............. | B60R 21/23138 280/739 |
| 2011/0272927 A1 | 11/2011 | Feller et al. | | |
| 2011/0298200 A1 | 12/2011 | Taniguchi et al. | | |
| 2014/0210192 A1* | 7/2014 | Hotta | ............. | B60R 21/23138 280/730.2 |

\* cited by examiner

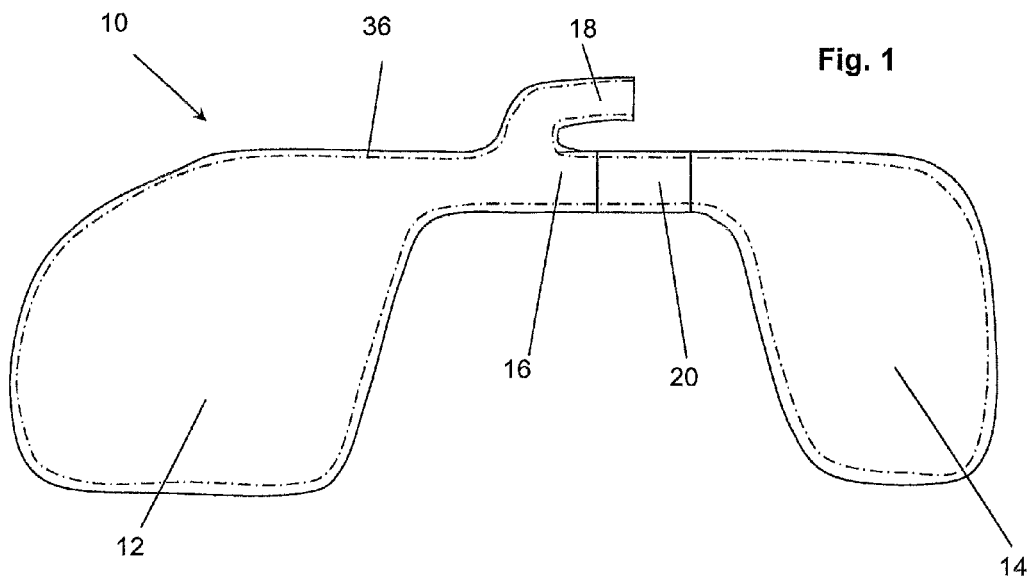
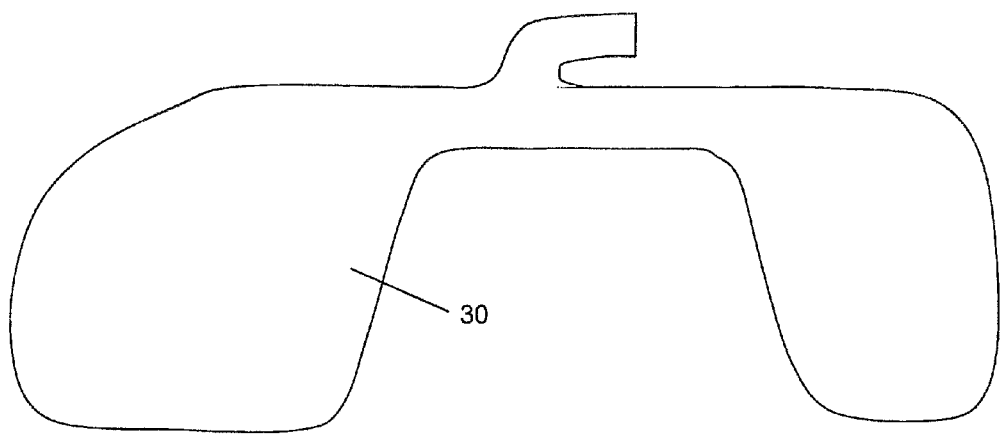
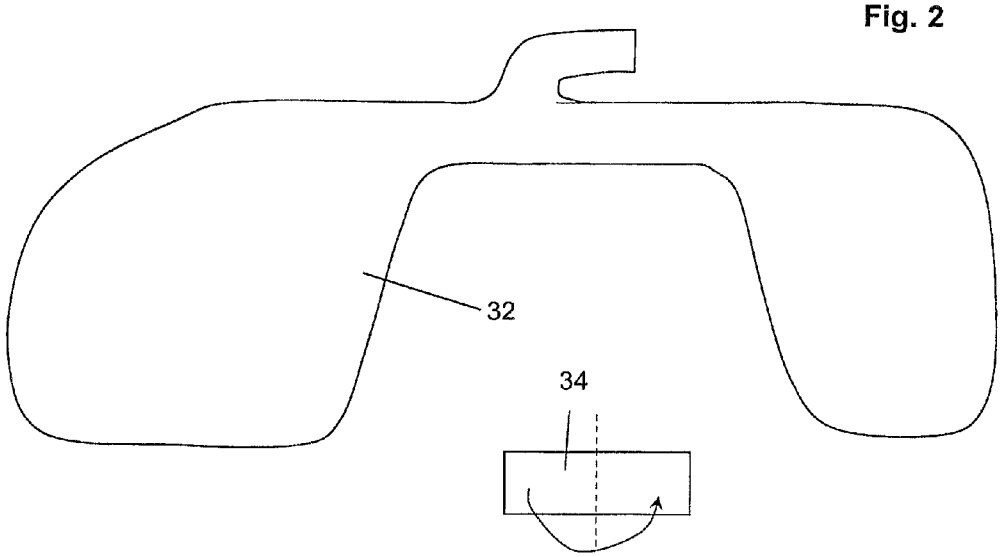

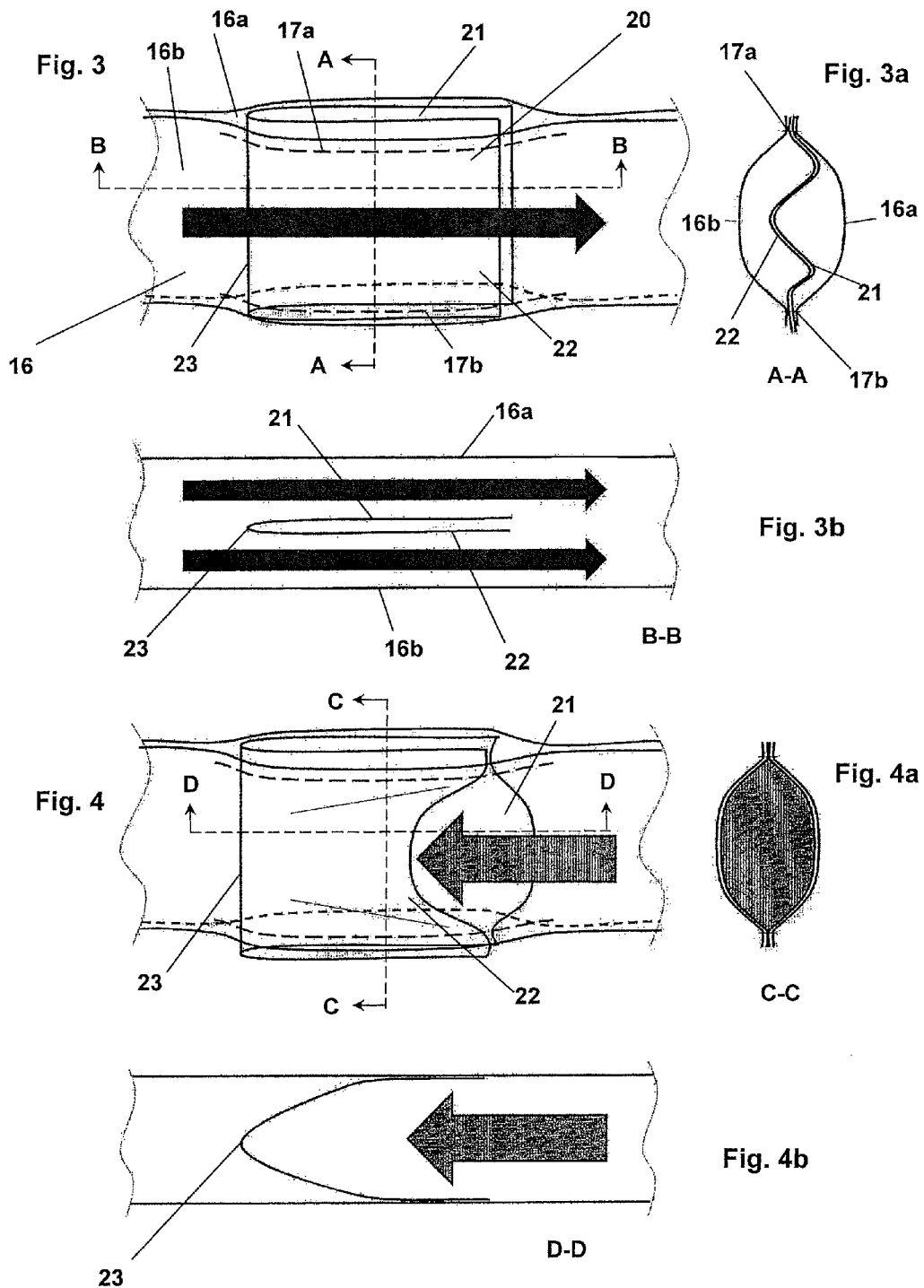

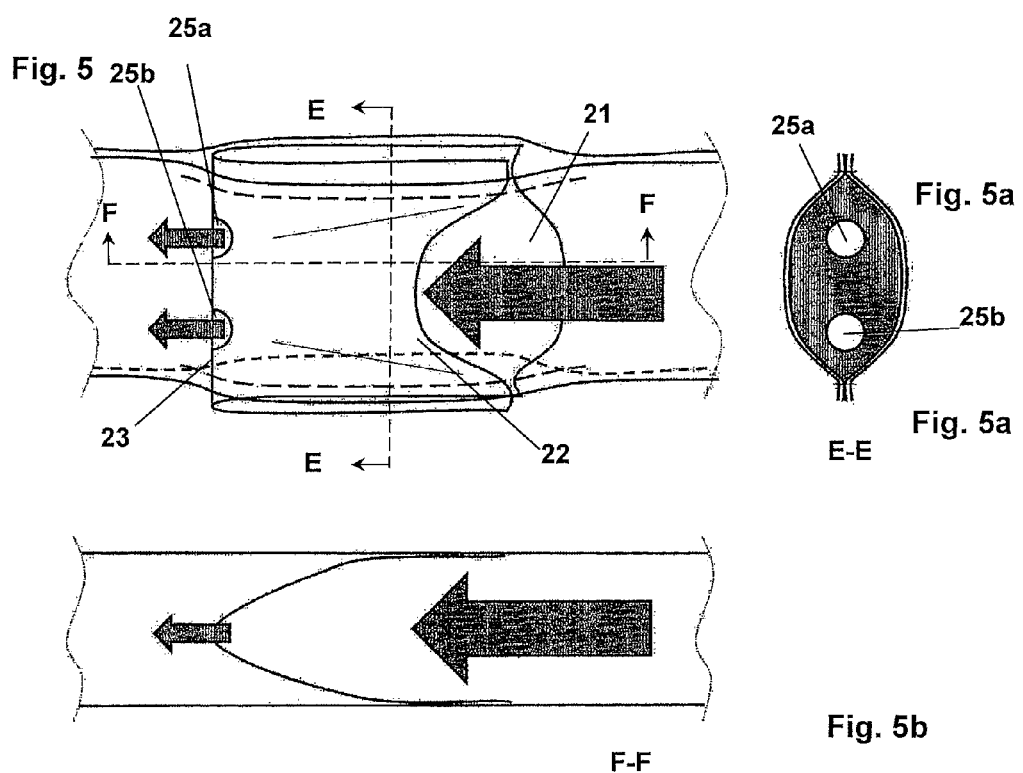

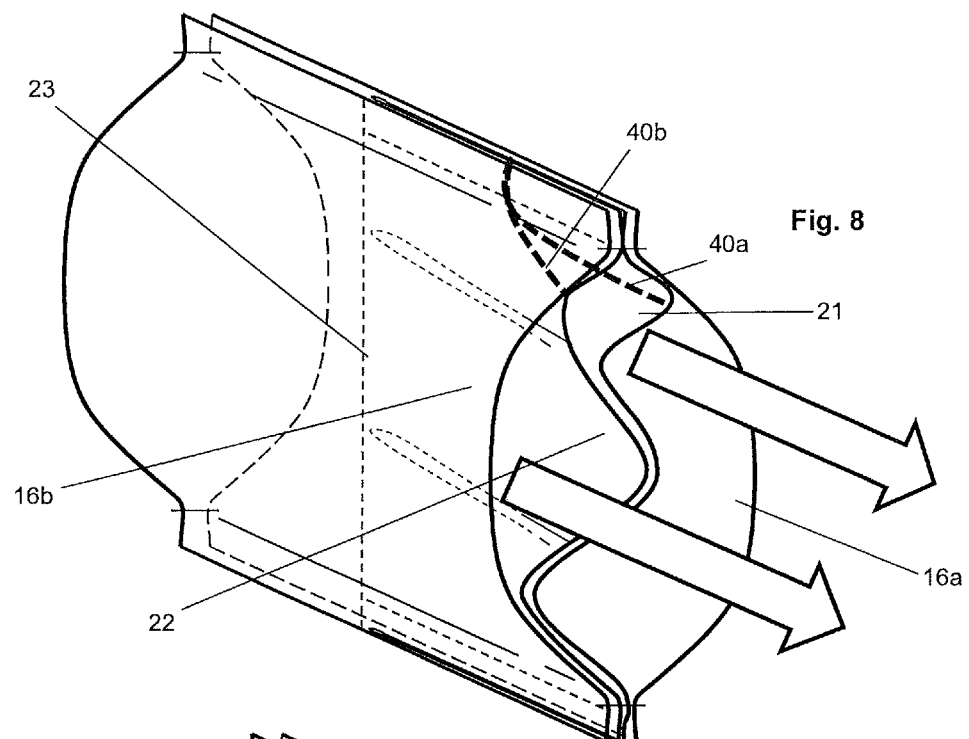
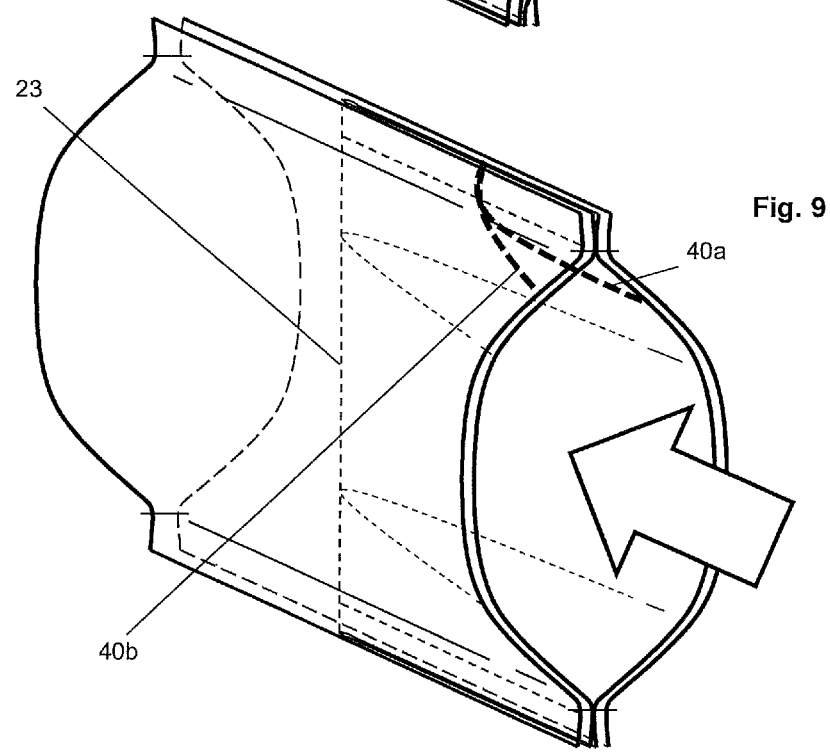

AIRBAG COMPRISING TWO CHAMBERS AND A GAS FLOW CHANNEL CONNECTING THE TWO CHAMBERS WITH A VALVE BEING LOCATED IN THE GAS FLOW CHANNEL

CROSS REFERENCE TO RELATED APPLICATIONS

This application is a 371 U.S. National Stage of International Application No. PCT/SE2012/051450, filed Dec. 20, 2012, and published in English as WO 2013/095283 A1 on Jun. 27, 2013, which claims priority to German Patent Application No. 102011011464.9, filed Dec. 24, 2011. The entire disclosures of the above applications are incorporated by reference herein.

TECHNICAL FIELD OF THE INVENTION

The invention is concerned with an airbag comprising two chambers being connected by a gas flow channel and a valve being located in said gas flow channel.

Especially from so-called curtain airbags it is known to provide two chambers serving for the protection of the passengers, wherein the two chambers are connected via a hose type gas flow channel. For example, the first chamber serves for protecting a passenger in the front and the second chamber serves for protecting a passenger in the rear of the vehicle.

In some applications it can be desired to provide a one way valve in the gas flow channel such that gas can stream unthrottled through the gas flow channel if the pressure inside the first chamber is higher than the pressure in the second chamber, but the gas stream through the gas flow channel is blocked or at least throttled if the pressure in the second chamber is larger than in the first chamber.

PRIOR ART

Such a valve is described in the generic U.S. Pat. No. 6,402,190 B1. Here, a two-layered inlay is provided inside the gas flow channel. A circumferential seam is provided at one end of the inlay which connects the two layers of the inlay to the two side walls of the gas flow channel. So, gas can stream unthrottled from the first end of the valve to its second end. In this case the two-layered inlay is inflated towards the side walls of the gas flow channel. In the opposite case the two-layered inlay collapses and blocks the gas flow.

A similar concept is shown in the DE 10 2009 005 834 A1.

SUMMARY OF THE INVENTION

Starting from this the invention sets itself the problem to improve the valve of a generic airbag. Especially the manufacture of the airbag should be very easy and the valve should be constructed in a way that allows the possibility of a defined throttling of the gas flow in the gas flow direction opposite to the unthrottled gas flow direction.

This problem is solved by an airbag according to claim 1.

As in the generic U.S. Pat. No. 6,402,190 B1 the valve is comprised of a two-layered inlay extending from a first end pointing towards the first chamber to a second end pointing towards the second chamber. But in contrast to the prior art, there is no circumferential seam such that a connection free area exists in which at least one layer of the two-layered inlay is not connected to the gas flow channel. Further, the two layers of the two-layered inlay are at least partially connected to each other in the area of the first end. Consequently, the gas flows between at least one layer of the two layered inlay and a side wall of the gas flow channel when flowing from the first to the second chamber, instead between the two layers of the two-layered inlay as is the case in the prior art.

As one will see from the description of the preferred embodiments, the assembly of the airbag is very easy and the additional work necessary in relation to an airbag without a valve is very minor. Additionally, one will see that it is very easy to "tune" the valve such that in the blocking/throttling direction a defined throttled gas flow can pass through the valve.

The invention will now be explained in detail by means of preferred embodiments in view of the accompanying figures. The figures show:

BRIEF DESCRIPTION OF THE DRAWINGS

FIG. 1 a schematic representation of a curtain airbag,

FIG. 2 the cuttings of which the curtain airbag of FIG. 1 is made,

FIG. 3 the detail D of FIG. 1 in a partially exploded representation in a state in which gas flows through the valve in its passing direction, FIG. 3a a sectional view along plane A-A in FIG. 3, FIG. 3b a sectional view along plane B-B in FIG. 3, FIG. 4 what is shown in FIG. 3 in a blocking state of the valve, FIG. 4a a sectional view along plane C-C in FIG. 4, FIG. 4b a sectional view along plane D-D in FIG. 4, FIG. 5a second embodiment of the valve in a representation according to FIG. 4, FIG. 5a a sectional view taken along plane E-E in FIG. 5, FIG. 5b a sectional view taken along plane F-F in FIG. 5, FIG. 6 an alternative embodiment to the embodiment shown in FIGS. 3 to 4 in a state in which gas flows through the valve in its passing direction, FIG. 7 what is shown in FIG. 6 in a blocking state of the valve, FIG. 8 a variant to what is shown in FIG. 6 in the state of FIG. 6, FIG. 9 what is shown in FIG. 8 in a blocking state of the valve, FIG. 10 an further alternative embodiment to the embodiment shown in FIGS. 3 to 4 in a state in which gas flows through the valve in its passing direction, FIG. 11 what is shown in FIG. 10 in a blocking state of the valve and FIG. 12 a sectional view taken along plane G-G in FIG. 11.

DETAILED DESCRIPTION OF PREFERRED EMBODIMENTS

Figure 6:
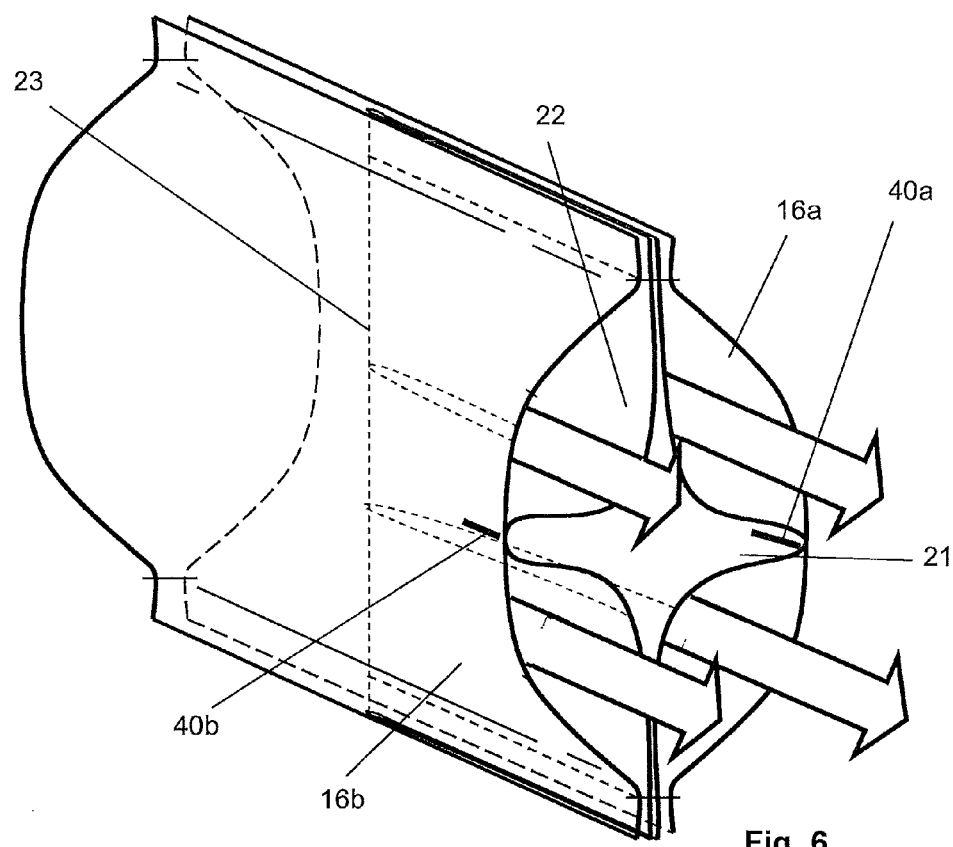

FIG. 1 shows a curtain airbag 10 in a schematic representation. The curtain airbag 10 comprises a first chamber 12 that may be assigned to a front seated passenger and a second chamber 14 that may be assigned to a passenger in the rear of a motor vehicle. The two chambers 12, 14 are connected via a hose-type gas flow channel 16. An accommodation area 18 for a gas generator (not shown) extends from the gas flow channel 16 as is well known in the art. A no-return valve 20 is located inside the gas flow channel 16 in an area between the accommodation area 18 and the second chamber 14. This no-return valve 20 acts such that gas can flow unthrottled into the second chamber 14, but not back. The construction of this no-return valve 20 and its way of operation will be described later in detail.

As can be seen from FIG. 2, the curtain airbag 10 is comprised of only three parts, namely a first cutting 30, a second cutting 32 and a third cutting 34. Of course, there may be more parts such as positioning tethers and attachment lugs, but since these elements are not necessary in order to understand the invention they are not shown. The first cutting 30 and the second cutting 32 are congruent and form the side walls of the curtain airbag 10. The third cutting 34 is a rectangle and forms the no-return valve 20. The assembly of the three parts is very easy: First, the third cutting 34 is folded in half as is shown in FIG. 2 and positioned on the respective gas flow channel area of the first cutting 30. Then, the second cutting 32 is positioned on the first cutting and the cuttings are sewn together with the edge seam 36. So, one can see that the effort necessary for the assembly of the curtain airbag 10 is not higher than for a curtain airbag without a valve.

The FIGS. 3, 3a and 3b show the detail D of FIG. 1 in various views. One sees a section of the hose-type gas flow channel 16 having a first side wall 16a and a second side wall 16b. Inside this gas flow channel 16 there is the valve 20 that is in form of a two-layered inlay made by the folded third cutting 34. So, this two-layered inlay has a first layer 21 and a second layer 22. The two layers 21, 22 are connected to each other via the fold 23 at the first end of the two-layered inlay. This first end points towards the first chamber 12. The first end of the two-layered inlay is connected to the gas flow channel 16 (namely its two side walls 16a, 16b) at two points, namely at its lower end and at its upper end, via the two closing lines 17a, 17b of the gas flow channel 16. The two closing lines 17a, 17b are sections of the edge seam 36 in this embodiment. In this preferred embodiment the upper end and the lower end of the two-layered inlay are connected to the side walls of the gas flow channel along its entire length, but this might not be necessary in all possible embodiments. In the preferred embodiment shown, the two closing lines 17a, 17b of the gas flow channel have two functions: First, they close the gas flow channel and second, they serve as connecting lines between the two-layered inlay and the side walls of the gas flow channel.

One can see that the two layers 21, 22 of the two-layered inlay of the valve are not connected to the side walls of the gas flow channel 16 between the closing lines 17a, 17b, which also constitute the connecting lines between the two-layered inlay and the gas flow channel 16. So, there exists a connection free area, in which both layers 21, 22 of the two-layered inlay are not connected to the side walls of the gas flow channel 16.

If the pressure inside the first chamber 12 is higher than in the second chamber 14, gas flows through the gas flow channel 16 and passes the valve 20 unthrottled, namely between the first layer 21 of the two-layered inlay and the first side wall 16a of the gas flow channel and between the second layer 22 of the two-layered inlay and the second side wall 16b of the gas flow channel 16. By doing so, the two layers of the two-layered inlay are pressed together. Of course, there is a slight throttling due to a slightly higher flow resistance, but in the definitions chosen here, this state is referred to as being unthrottled.

In the other case, this is if the gas pressure inside the second chamber 14 is higher than in the first chamber 12 (this can for example occur, if a vehicle passenger in the rear of the vehicle hits the second chamber 14, but the first chamber 12 is not hit by a passenger) the valve being formed of the two-layered inlay blocks the gas flow as is shown in FIGS. 4, 4a and 4b. Gas enters the space between the two layers 21, 22 but cannot escape, because the first end is closed by the fold 23. So, the pressure between the two layers rises and presses the two layers outwardly towards the side walls 16a, 16b and closes the valve. This works very reliably.

The FIGS. 5, 5a and 5b show a second embodiment of the invention in a representation according to FIGS. 4, 4a and 4b. Here, the valve allows a throttled gas flow from the second chamber to the first chamber. In order to achieve this, at least one hole (here two holes 25a, 25b) is provided in the fold 23 at the first end of the two-layered inlay. So, a clearly defined gas stream can pass through the valve in the direction opposite of the unthrottled passing direction. The amount of the gas flow can precisely be tuned by the choice of the total cross section of the holes. The assembly of the curtain airbag is as easy as in the first embodiment.

Figure 7:
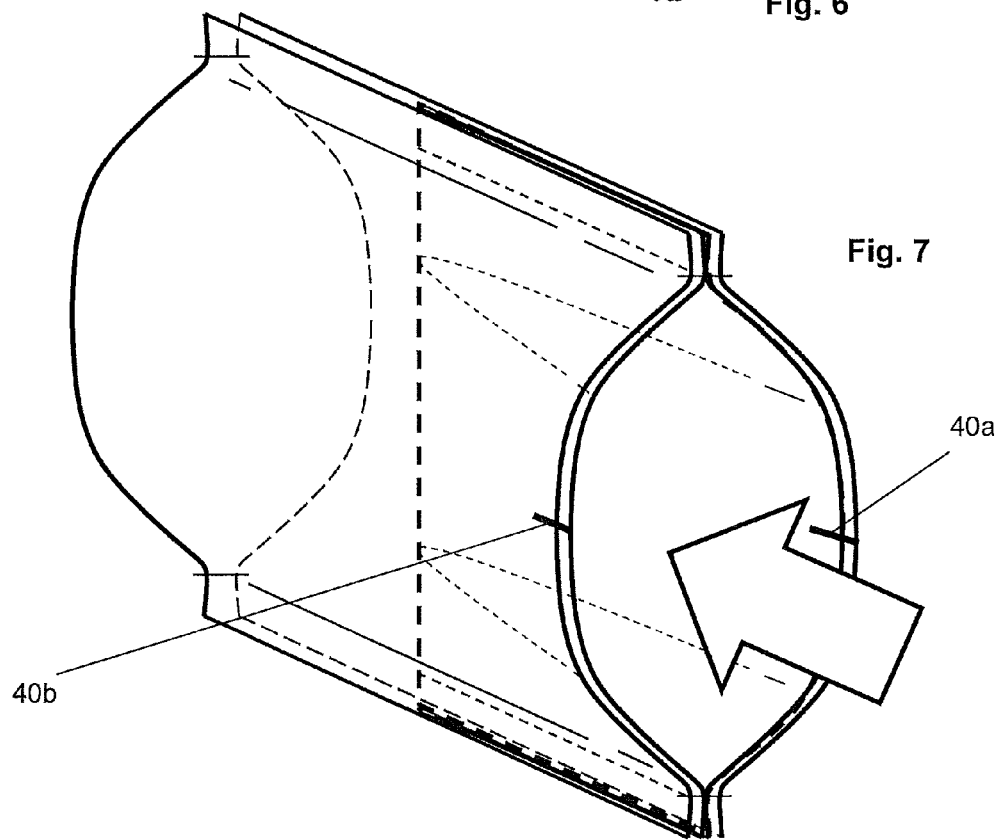

The FIGS. 6 and 7 show an embodiment which is very similar to the one which is shown in FIGS. 3 to 4. The difference is that the first layer 21 of the two-layered inlay is additionally connected to the first side wall 16a by means of a first positioning seam 40a. This first positioning seam 40a is located at the second end of the two-layered inlay (this is the end remote from the fold 23). This first positioning seam 40a is basically located in the middle of the height of the first layer 21. The same applies to the second layer 22: The second layer 22 is at its second end additionally connected to the second side wall 16b by means of a second positioning seam 40b. By this positioning seams 40a, 40b, four "sub-channels" are defined in the passing state of the valve as is shown in FIG. 6.

The advantage of the presence of the positioning seams 40a, 40b is that in the passing state (FIG. 6) there is no risk the fold 23 bulges inwardly which could lead to an undesired blocking or partial blocking of the gas flow and that in the blocking state (FIG. 7), the second end of the two-layered inlay is already open at the beginning of the blocking of the gas flow, which leads to an immediate reaction.

The FIGS. 8 and 9 show a variant of the embodiment just described: Here, the positioning seams 40a, and 40b are positioned at an upper position.

Although not shown in the figures, it is possible to combine the embodiment shown in FIGS. 5 to 5b (at least one hole in the area of the first end) with the embodiment shown in FIGS. 6 to 9 (positioning seams).

Figure 10:
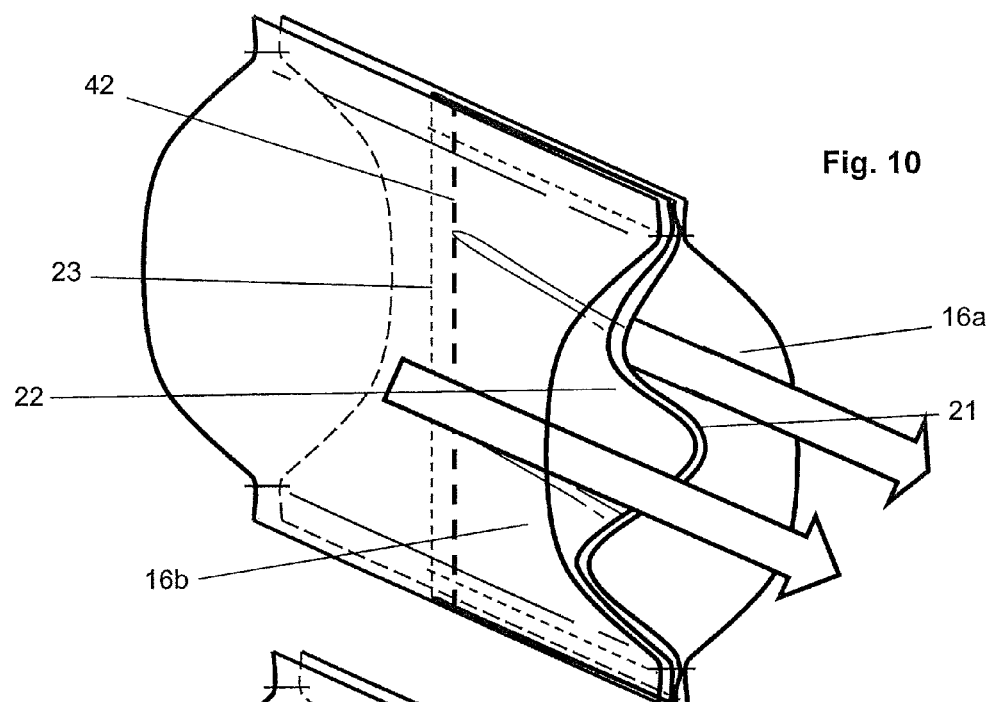
Figure 11:
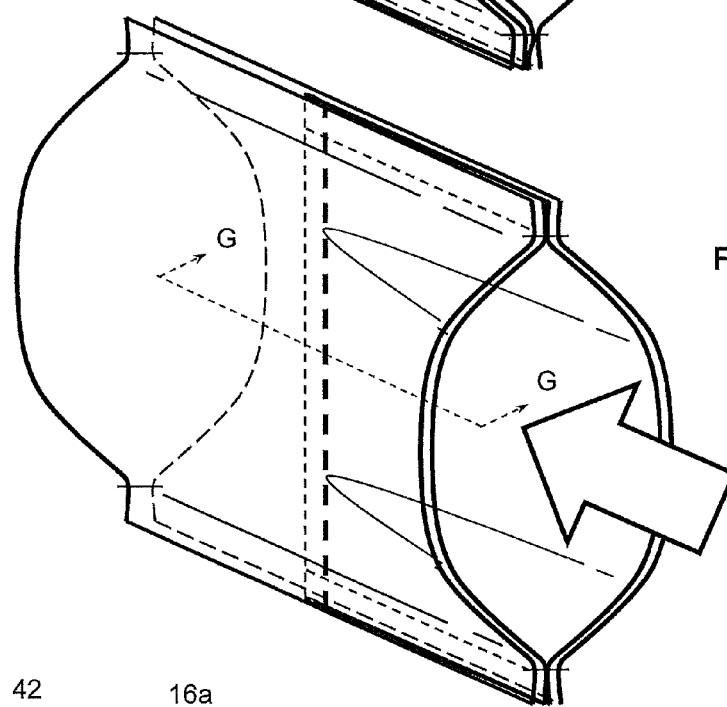
Figure 12:
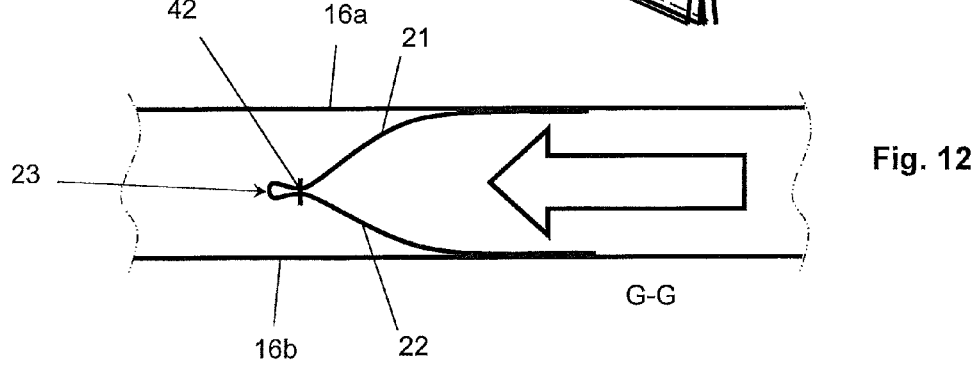

FIGS. 10 to 12 show another embodiment of the invention: Here, a stiffening seam 42 is provided next to the fold 23 and extending basically parallel to the same. This stiffening seam 42 especially prevents the first end of the two layered inlay from bulging inwardly in the passing state.

The invention has been described by ways of a curtain airbag which is the preferred application, but it should be pointed out that the invention might also be applied to other types of airbags, especially to seat mounted or car body/door mounted side airbags.

LIST OF REFERENCE NUMBERS 10 curtain airbag
12 first chamber
14 second chamber
16 gas flow channel
16a first side wall
16b second side wall
17a first closing line
17b second closing line
18 accommodation area for gas generator
20 valve
21 first layer
22 second layer
23 fold
25a,b hole 30 first cutting
32 second cutting
34 third cutting
36 edge seam
40a,b positioning seam
42 stiffening seam

The invention claimed is:

1. An airbag comprising:
a first chamber and a second chamber:
a gas flow channel connecting the first and second chambers; and
a valve located inside the gas flow channel which allows an unthrottled gas stream from the first chamber to the second chamber when a first pressure inside the first chamber is higher than a second pressure in the second chamber and that restricts the gas stream through the gas flow channel when the second pressure is higher than the first pressure, the valve constructed of a two-layered inlay extending from a first end pointing towards the first chamber to a second end pointing towards the second chamber, the two-layered inlay connected to the gas flow channel at the first end via at least two connecting points being remote from each other, a connection free area between the two connecting points in which at least one layer of the two-layered inlay is without connection to the gas flow channel and in that the two layers of the two-layered inlay are at least partially connected to each other proximate the first end.

2. The airbag according to claim 1, wherein in the connection free area both layers are not connected to the gas flow channel.

3. The airbag according to claim 1, further comprising first and second connecting lines extending from the first and connecting points, respectively.

4. The airbag according to claim 3, wherein the first and second connecting lines extend along an entire length of the two-layered inlay.

5. The airbag according to claim 1, wherein the gas flow channel includes two side walls connected by two closing lines.

6. The airbag according to claim 3, wherein each connecting line is a section of a closing line.

7. The airbag according to claim 1, wherein the two-layered inlay is folded from a single cutting.

8. The airbag according to claim 7, wherein a fold of the single cutting defines the first end of the two-layered inlay.

9. The airbag according to claim 8, further comprising a stiffening seam connecting the two layers adjacent to the fold.

10. The airbag according to claim 9, wherein the stiffening seam extends parallel to the fold.

11. The airbag according to claim 9, wherein the stiffening seam prevents inward bulging of the first end of the two-layer inlay.

12. The airbag according to claim 1, wherein at least one hole is provided in the two-layered inlay proximate the first end.

13. The airbag according to claim 1, wherein the two-layered inlay is completely closed proximate the first end.

14. The airbag according to claim 1, further comprising a first position seam connecting a first layer of the two-layered inlay to a first side wall at the second end of the two-layered inlay and/or a second position seam connecting a second layer of the two-layered inlay to the second side wall at the second end of the two-layered inlay.

15. An airbag comprising:
a first chamber and a second chamber;
a gas flow channel connecting the first and second chambers; and
a valve located inside the gas flow channel which allows an unthrottled gas stream from the first chamber to the second chamber when a first pressure inside the first chamber is higher than a second pressure in the second chamber and that restricts the gas stream through the gas flow channel when the second pressure is higher than the first pressure, the valve constructed of a two-layered inlay extending from a first end pointing towards the first chamber to a second end pointing towards the second chamber, the two-layered inlay connected to the gas flow channel at the first end via at least two connecting points being remote from each other, a connection free area between the two connecting points in which at least one layer of the two-layered inlay is without connection to the gas flow channel and in that the two layers of the two-layered inlay are at least partially connected to each other proximate the first end,
wherein the two-layered inlay is folded from a single cutting folded at a fold line to define a first end of the two-layered inlay.

16. The airbag according to claim 15, further comprising a stiffening seam connecting the two layers adjacent to the fold.

17. The airbag according to claim 16, wherein the stiffening seam extends parallel to the fold.

18. The airbag according to claim 16, wherein the stiffening seam prevents inward bulging of the first end of the two-layer inlay.

* * * * *